United States Patent [19]

Hosaka et al.

[11] Patent Number: 4,800,482

[45] Date of Patent: Jan. 24, 1989

[54] SEQUENCE CONTROLLER USING PULSE COUNTS TO ACTIVATE/DEACTIVATE CONTROLLED ELEMENTS

[75] Inventors: Masao Hosaka, Sagamihara; Yoshitaka Ogino; Kazutoshi Shimada, both of Kawasaki; Takashi Saito, Ichikawa, all of Japan

[73] Assignee: Canon Kabushiki Kaisha, Tokyo, Japan

[21] Appl. No.: 170,074

[22] Filed: Mar. 15, 1988

Related U.S. Application Data

[63] Continuation of Ser. No. 726,884, Apr. 24, 1985, abandoned.

[30] Foreign Application Priority Data

Apr. 27, 1984 [JP] Japan .................................. 59-86597
Apr. 28, 1984 [JP] Japan .................................. 59-86894

[51] Int. Cl.[4] ............................................ G03G 15/00
[52] U.S. Cl. .................................. 364/140; 355/14 R
[58] Field of Search ............ 364/140; 355/14 R, 14 C

[56] References Cited

U.S. PATENT DOCUMENTS

| 4,270,860 | 6/1981 | Tsuda et al. ...................... 355/14 R |
| 4,280,763 | 7/1981 | Arai et al. ......................... 355/14 R |
| 4,530,063 | 7/1985 | Masuda et al. .................... 355/14 R |

Primary Examiner—Jerry Smith
Assistant Examiner—Clark A. Jablon
Attorney, Agent, or Firm—Fitzpatrick, Cella, Harper, and Scinto

[57] ABSTRACT

A sequence in the control apparatus of a copy machine performs sequence timing control of electronic equipment in a predetermined order and includes a counter for counting timing pulses received from an external device. A comparison register is included in the controller for comparing a count of the counter with data stored in a memory. The controller may also include a means for designating a channel in correspondence with a control object or a means for designating a channel in accordance with a program preset during the initialization of the equipment. Comparison data may be provided as a ROM code and transmitted to a data area in accordance with the control object preset at initialization so as to be selectively used.

11 Claims, 13 Drawing Sheets

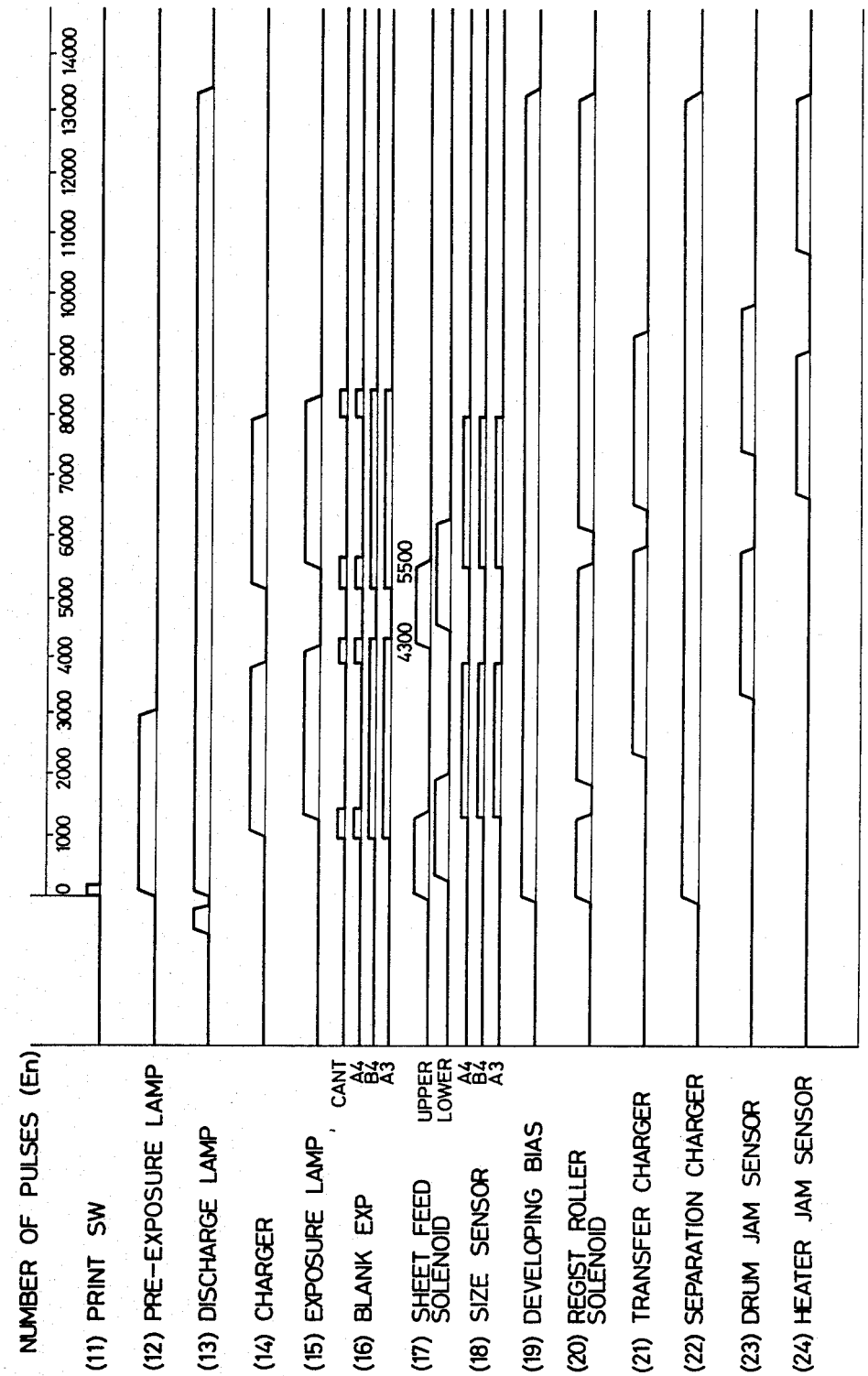

SEQUENCE CONTROLLER USING PULSE COUNTS TO ACTIVATE/DEACTIVATE CONTROLLED ELEMENTS

This application is a continuation of application Ser. No. 726,884, filed Apr. 24, 1985, now abandoned.

BACKGROUND OF THE INVENTION

1. Field of the Invention

The present invention relates to an apparatus for performing sequence control of electronic equipment.

2. Description of the Prior Art

Recently, one-chip microcomputers have been developed having a wide application, such as in industrial equipment, commercial equipment, and the like. Since they have greatly reduced cost, one-chip microcomputers have become essential to sequence controllers. Furthermore, performance has recently been improved and cost lowered by expanding memory capacity, extending an I/O port, and integrating functions of a counter, A/DC, D/AC, PLL, CCD drivers and the like on one chip. However, development of products to which high performance microcomputers can be applied has lagged behind the development of microcomputers. This is because it takes a long time to develop a product to which the microcomputer is applied, and the program development thereof requires many steps. This is a serious problem when keen competition demands that products be continually improved.

Generally, the number of steps required for programming exponentially increases with required improvements in functions, requiring many engineers. The number of days required for product development depends upon the number of steps required for programming. This greatly affects profitability. FIG. 1 shows the relationship between a program capacity and the number of months required for programming (including debugging). As can be seen from this graph, programming requires many months.

Thus, every time a new product is developed, the time required for developing software is increased and interferes with product development, as has been described above. Although performance of the equipment can be improved using microcomputers, their use causes an increase in the number of steps needed for development.

As an example, in the case of electronic copy machines, product development is generally started when specific processes of the copy machine (e.g., a photosensitive member, toner, paper, and a matching characteristic therewith) are unstable. Since a microcomputer system is developed parallel to the stabilization of such processes, an alteration in design including software and hardware must be performed twice or more depending upon a state of the processes, Thus, the programming and debugging must be started from the beginning for each design alteration, and the number of steps is further increased. This delays product development, and increases the work load for programmers.

Conventionally, software and hardware are developed specifically for each product. Therefore, when a new product is developed, software and hardware must again be designed for that product. When a new chip is introduced, development tools must be prepared and personnel must be trained. This also increases the number of steps required for development.

Therefore, sequence control programs of a copy machine are usually monitored and stored in memories, and respective programs are divided into tasks so as to form corresponding modules. Thus, programs need not be developed every time the machine is redesigned, and desired programs are constituted using library standard module programs. With this method, since the programs need not be completely redeveloped, development time can be shortened. However, a program capacity is greatly increased, and particularly in machines such as a copy machine, an OCR, an intelligent robot and the like which must be operated in real time, real time control of tasks cannot be performed, Furthermore, in the von Neumann method wherein a sequence is advanced step-by-step by collating with programs, a program flow is complex, processing speed is low, and analog processing cannot be performed.

SUMMARY OF THE INVENTION

The present invention has been made in consideration of the above situation, and has as its object to provide an apparatus for controlling electronic equipment with a one-chip microcontroller provided with an intelligent hardware function without using a program.

It is another object of the present invention to provide a simple control apparatus for electronic equipment which can shorten the time required for preparation and design of a program and debugging thereof.

It is still another object of the present invention to provide a control apparatus for electronic equipment which can construct a program with a simple structure and perform analog and servo control with a single chip, has a high porcessing speed, and can easily perform multitask control.

It is still another object of the present invention to provide a control apparatus for electronic equipment in which in timing control of the equipment, timing data can be selected from its own memory accessing a single chip even in the equipment having different specifications.

The above and other objects of the present invention will be described in detail hereinafter.

BRIEF DESCRIPTION OF THE DRAWINGS

FIGS. 3-1 and 3-2 are block diagrams of a microcontroller;

FIGS. 6-1, 6-2(a) and 6-2(b) are timing charts of a sequence of an apparatus, and FIG. 6-3 is a view for explaining overlapping processes of the copy machine;

DETAILED DESCRIPTION OF THE PREFERRED EMBODIMENTS

Figure 1:
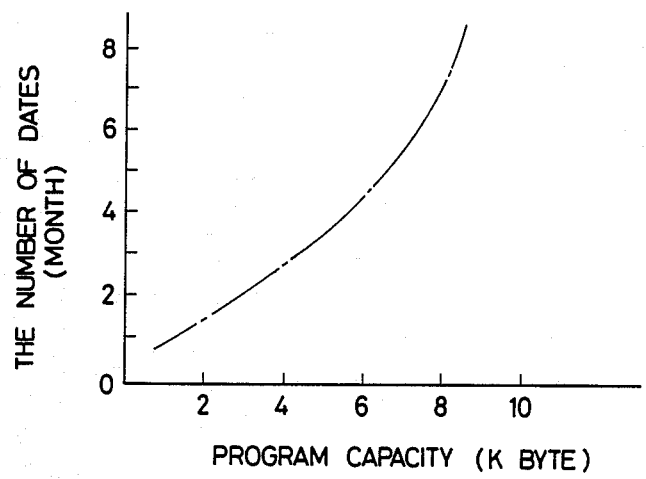
FIG. 1 is a graph showing the number of months required for development.

The present invention will be described hereinafter.

A controller according to the present invention performs sequence timing control of electronic equipment in a predetermined order, and comprises a counter for counting timing pulses received from an external device, and a comparison register for comparing a count of the counter with data stored in a memory. Furthermore, the controller can comprise a means for designating a channel in correspondence with a control object, or a means for designating a channel in accordance with a program during initialization of the equipment when it is powered. Note that the above comparison data can be provided as a ROM code and transmitted to a data area in accordance with the control object when the equipment is initialized so as to be selectively used. Note that the above configuration can be stored on a single chip.

The present invention will be described in detail hereinafter with reference to the accompanying drawings.

Symbols used in the drawings are shown in Table 1 wherein ①  represents a TTL buffer; ②, a TTL inverter; ③, an npn power transistor; and ④, a pnp power transistor.

TABLE 1

| Symbol | | Explanation of symbol |
|---|---|---|
| ① | ▷ | TTL buffer |
| ② | ▷∘ | TTL inverter |
| ③ | ▷ | npn power transistor |
| ④ | ▷ | pnp power transistor |

Figure 2:
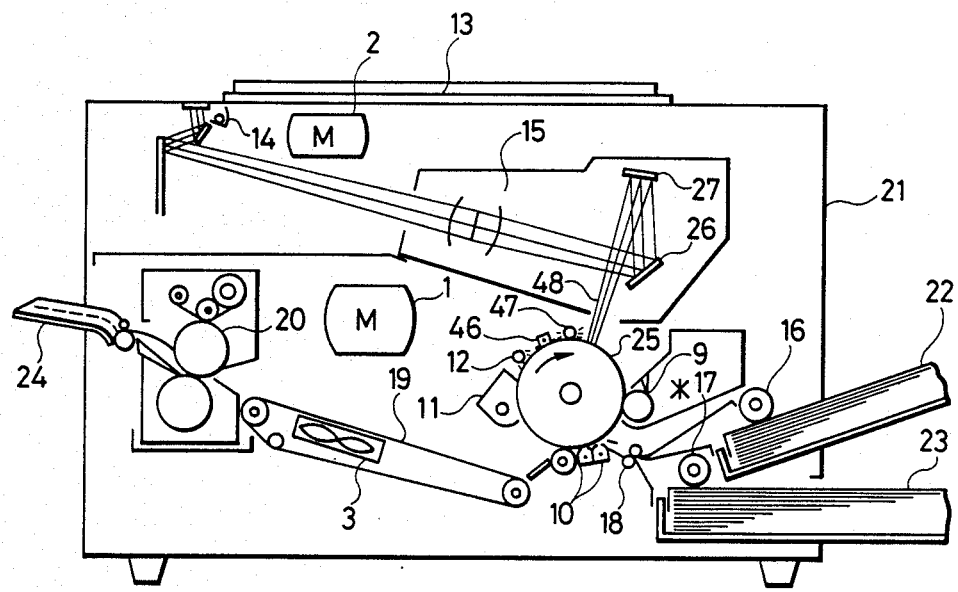
FIG. 2 is a view showing a structure of a copy machine.

FIG. 2 shows a structure of a copy machine as an example of electronic equipment to which the present invention can be applied. The copy machine comprises two DC motors for driving a main body mechanism (e.g., a photosensitive drum, a paper feed system, and a conveyor system) and for driving an optical system. In addition to these motors, the copy machine comprises a cooling fan motor, a paper convey motor, a fixing roller motor and the like. However, the two DC motors function as a main driving system of the machine.

Paper feed cassettes 22 and 23 are provided at one side of a housing 21 of the copy machine, and a discharge tray 24 is provided at the other side thereof. A corona charger 46, an erase lamp 47, an optical system 48, a developing roller 9, a transfer/peeling charger 10, a cleaning device 11, and a preexposure lamp 12 are arranged around a photosensitive drum 25, as shown in FIG. 2. A contact glass 13 is provided on an upper surface of the housing 12, and an original placed thereon is irradiated with light emitted from an exposure lamp 14. Light reflected therefrom is guided to the optical system 48 through a lens system 15. Paper sheets stored in the paper feed cassettes 22 and 23 are guided to register rollers 18 and by corresponding paper feed rollers 16 and 17. The paper sheet to which a toner image formed on the photosensitive drum 25 is transferred by means of the transfer/peeling charger 10 is supplied to fixing rollers 20 by a conveyor belt 19, and is finally supplied to the discharge tray 24.

Note that a DC motor 1 drives the drum, a conveyor system, a fixing unit and respective mechanisms at a constant speed. A DC servo motor 2 is provided for driving the optical system. A vacuum motor 3 is provided for drawing the paper sheet by suction so as to maintain tight contact with the conveyor belt 19. The vacuum motor 3 is also a DC motor. In this copy machine, all the driving motors are DC motors so that a cumbersome operation for changing a specification accompanied by conversion of a gear ratio due to a difference in power source frequency (50 and 60 Hz) is not required. In addition, a DC motor is compact in size and can generate a high torque as compared to an AC motor.

Operation of the copy machine will be described hereinafter. When a power switch is turned on, the photosensitive drum is initialized. In other words, the photosensitive drum is cleaned and a preexposure lamp is turned on so as to erase a surface potential of the drum, thereby evenly discharging the surface potential thereof. When a temperature of the fixing rollers 20 reaches a preset temperature, a copy enable signal is displayed on an operation unit (not shown). In this manner, conditions for starting the copying operation are set. Then, a user sets a paper size and a copy number and presses a print button. When the print button is depressed, a paper sheet is fed from the cassette 22 or 23, and when it reaches the register roller 18, a leading edge thereof is aligned with the image. During this interval, the paper size is detected by a photosensor or the like. Reflection type photosensors are aligned so as to correspond to the paper size and a convey time of the paper sheet is counted, thereby detecting the paper size. In a latter stage, blank exposure of leading, rear and side edges is performed in accordance with the paper size data so as to prevent toner from being applied to a portion other than an image forming region. When the optical system scans the original, an image density on the original and a size thereof are scanned by a photodiode (not shown), the scanning data is converted into digital data, the digital data is fed back in real time, and exposure bias control is performed, thereby automatically controlling the image density. In this case, the data is fed back to a developing bias control data (not shown) so as to change a bias value, thereby appropriately adjusting a density.

The optical system for scanning the original surface is controlled by a servo motor so as to perform full-size and short-size scanning in accordance with the above-mentioned paper size data, thereby scanning the original surface at a double speed.

In this manner the paper sheet to which an image is transferred is fixed by the fixing rollers 20 and thereafter stacked on the discharge tray 24.

Figures 1, 3:
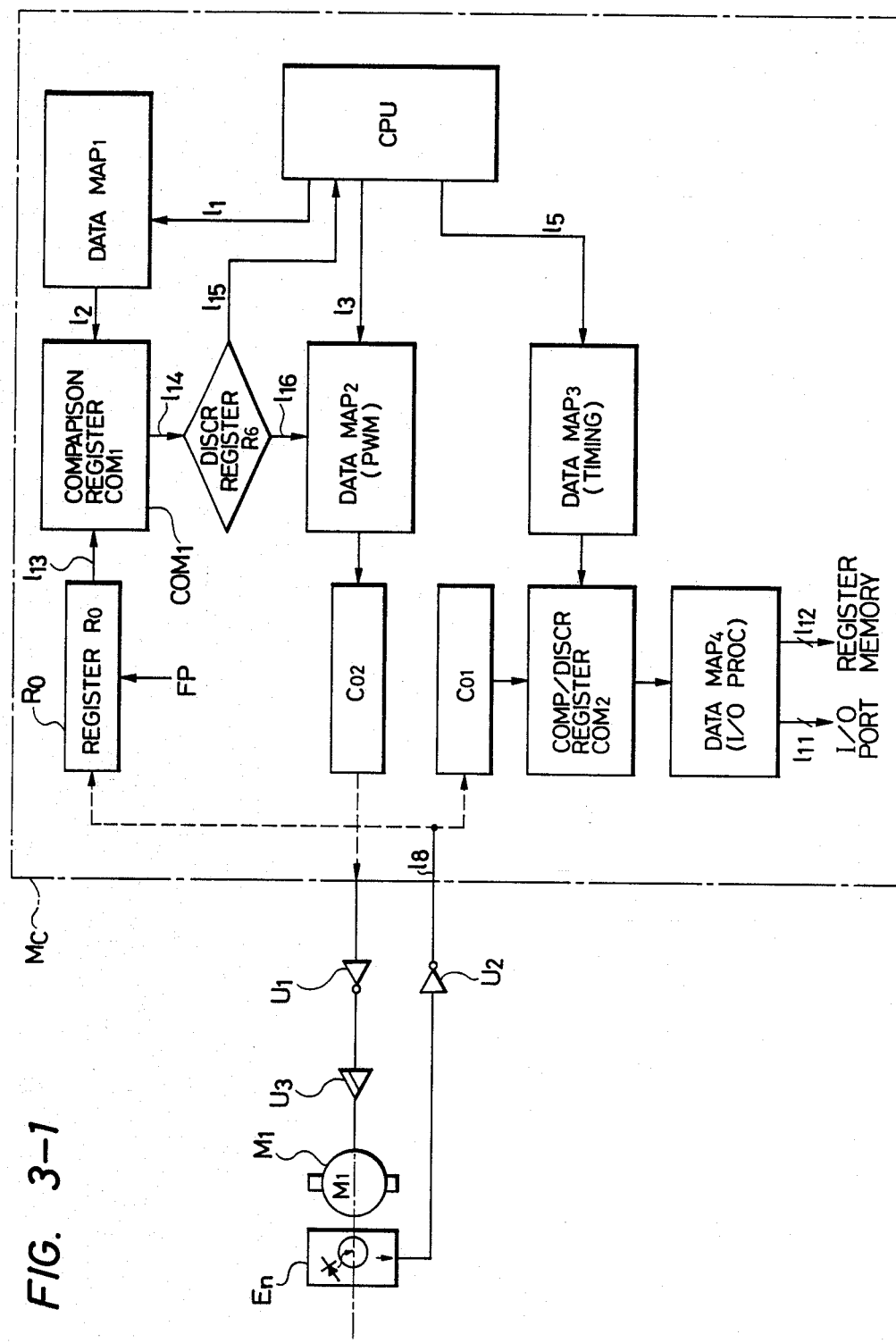
Figures 2, 3:
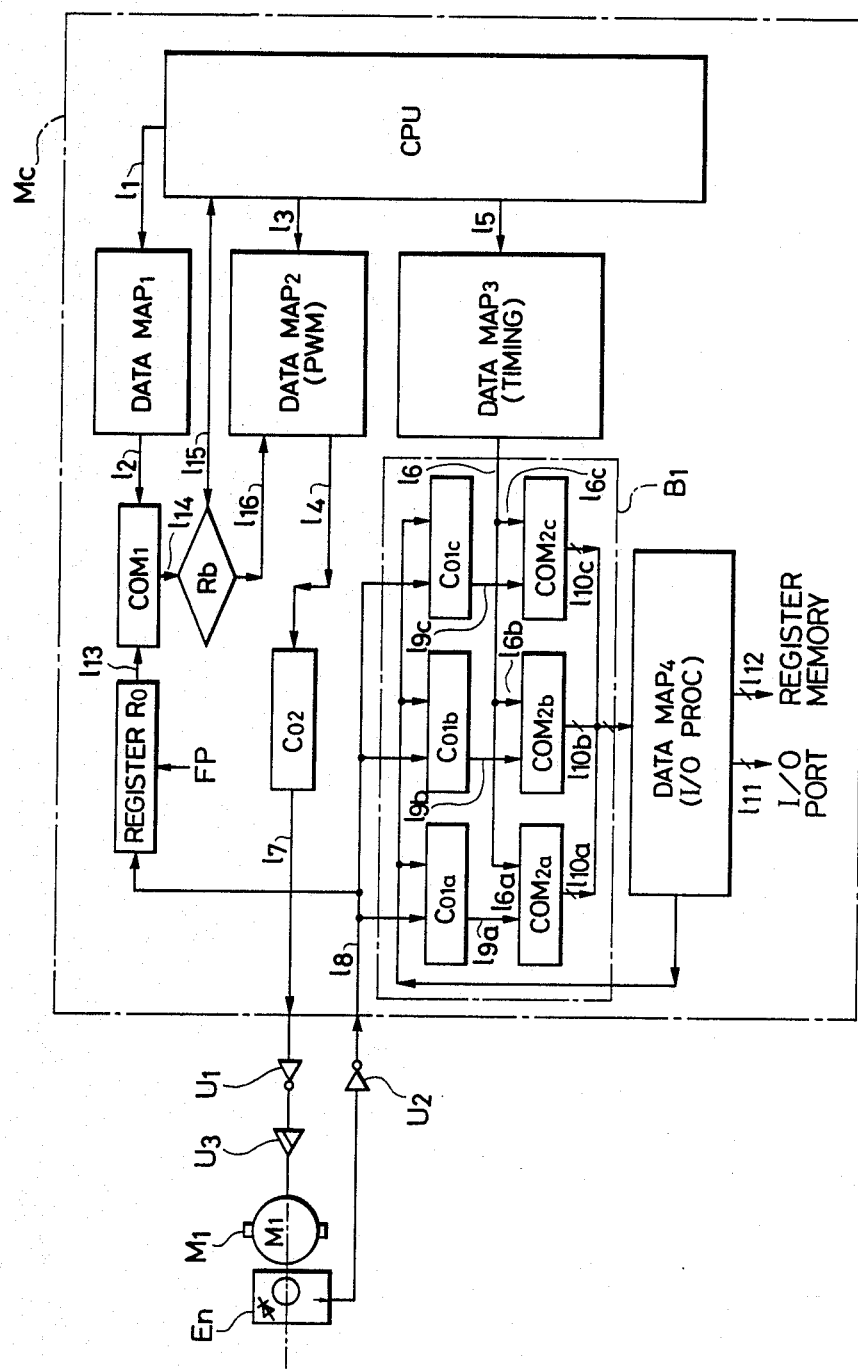
Figure 4:
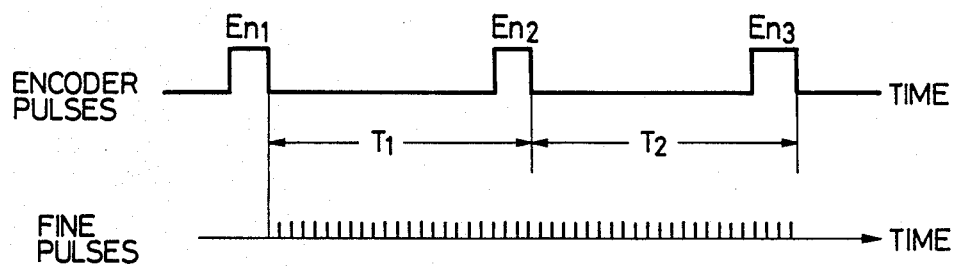
FIG. 4 is a timing chart showing the relationship between an encoder pulse and a fine pulse.

FIG. 3-1 is a block diagram of a microcontroller, which shows only a data area and a register portion needed for sequence control in the microcontroller. For the sake of simplicity, FIG. 3-1 shows a case wherein a main driving motor $M_1$ is biased by an output from an output port of a microcontroller (to be referred to as an MC for brevity hereinafter) so as to supply to the MC pulses generated from an encoder En coupled to the axis of the motor $M_1$. In other words, in this embodiment, the encoder pulses generated by the rotation of the motor $M_1$ are obtained, and the number thereof is counted so as to advance a sequence. The elements of FIG. 3-1 will first be described. A register $R_0$ is provided for counting a pulse interval $T_1$ generated from the encoder En. FIG. 4 shows this relationship. The pulses generated by the encoder En are wave-shaped by a buffer $U_2$ and are supplied to the register $R_0$ through a line $l_8$ in the MC. The register $R_0$ counts fine pulses FP generated from a CPU osillator and crystal oscillator F, and the count value of the fine pulses FP is supplied to a comparison register $COM_1$ through a line $l_{13}$ in synchronism with the trailing edge of the encoder pulse from the line $l_8$. In this case, the count of the register $R_0$ is cleared, and the register $R_0$ restarts counting of the fine pulses FP. The comparison register $COM_1$ compares the count data from the register $R_0$ with given data in a memory $DATA\ MAP_1$ designated by preset sequence data (or position data). The count data of the encoder pulse interval stored in the $DATA\ MAP_1$ is used for discriminating a speed of the motor $M_1$, and the data to be compared by the register $COM_1$ is selected by a CPU from the $DATA\ MAP_1$ in accordance with the position data of the sequence. A comparison result is supplied to a discrimination register $R_6$ through a line $l_{14}$, and when the result falls within the preset range, PWM (pulse width modulation control) data is supplied from a $DATA\ MAP_2$ through an output port of a register $CO_2$ to a buffer $U_1$ in a preset order. Since the motor $M_1$ is a DC motor and a DC voltage level is changed by a chopping time constant of the PWM data, the rotation thereof can be controlled. On the other hand, if the comparison result is outside of the preset range, this state is signalled to the CPU by an internal interruption signal through a line $l_{15}$ via line $l_{14}$ and a discrimination register Rb. Assuming that the count value input from the register $R_0$ is given as n0, the comparison register $COM_1$ performs a comparison as follows:

n0    na to nb

The data na to nb are stored in the $DATA\ MAP_1$. In such an automatic control system of a servo system, comparison of an absolute value is not performed. Therefore, the register discriminates whether or not the input data is higher or lower than the preset range na to nb, When an interruption occurs, the CPU recognizes that the input data is outside of the preset range, and rewrites a content of the $DATA\ MAP_2$ through a line $l_3$ so as to return the control system which is outside of the range to a target value, thereby changing the PWM data in the register $CO_2$. In this manner, a speed of the motor $M_1$ is set to be the target value, and is continuously updated.

As described above, referring to FIG. 3-1, the encoder pulses for controlling a speed of the motor are counted so as to control a sequential timing. Alternatively, as shown in FIG. 3-2, a counter for counting for sequential timing control and a register for comparison and discrimination are divided into a plurality of blocks, thereby realizing high speed operation. Furthermore, when such blocks are selectively used, the apparatus of this embodiment can be applied to both high and low speed machines. Furthermore, when a short program for discriminating the number of blocks to be used is inserted in an initialization program used when the machine is powered, sequential timing control can be performed by a single chip (controller).

Figure 5A:
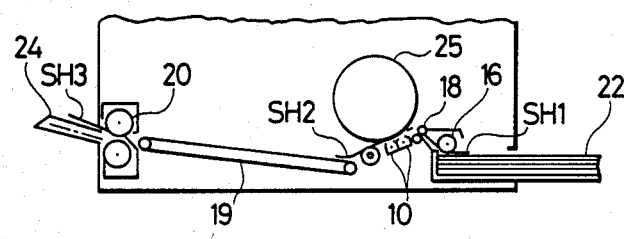
FIGS. 5(a) to (c) are views showing the relationship between a processing speed of an image processing apparatus and movement of paper.
Figure 5B:
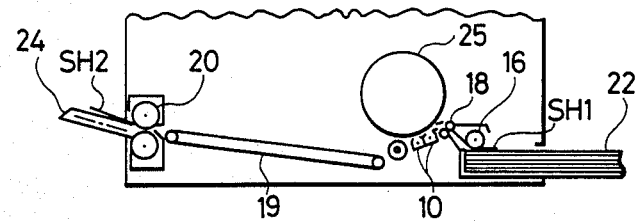
Figure 5C:
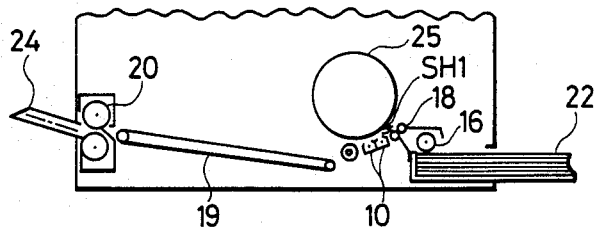

FIGS. 5(a) to 5(c) show the relationship between processing speed of the copy machine and movement of a paper sheet in the machine. For the sake of simplicity, only a part of the machine is shown. Note that the same reference numerals as in FIG. 2 denote the same parts in FIGS. 5(a) to 5(c). FIG. 5(a) shows a high speed machine which can process 40 or more paper sheets per minute, FIG. 5(b) shows a middle speed machine which can process 20 to 30 paper sheets per minute, and FIG. 5(c) shows a low speed machine which can process 20 or less paper sheets per minute. In continuous processing, a plurality of paper sheets, e.g., SH1, SH2, and SH3 are simultaneously fed in the machine.

One copy is normally formed after the paper feed, charging, exposure, developing, transfer, peeling, convey, fixing, and photosensitive drum discharging processes are performed. As the number of paper sheets to be processed is increased, the copying processes overlap each other such that fixing, transferring, exposure, and paper feed operations are simultaneously performed for different paper sheets. In the low speed machine, since the copying processes do not overlap each other, as shown in FIG. 5(c), the above-mentioned copying processes can be performed in the order described. A timing of a sequence will be described hereinafter.

FIGS. 6-1, 6-2(a) and 6-2(b) are timing charts showing a main sequence corresponding to the high speed machine shown in FIG. 5(a).

Figures 1, 6:
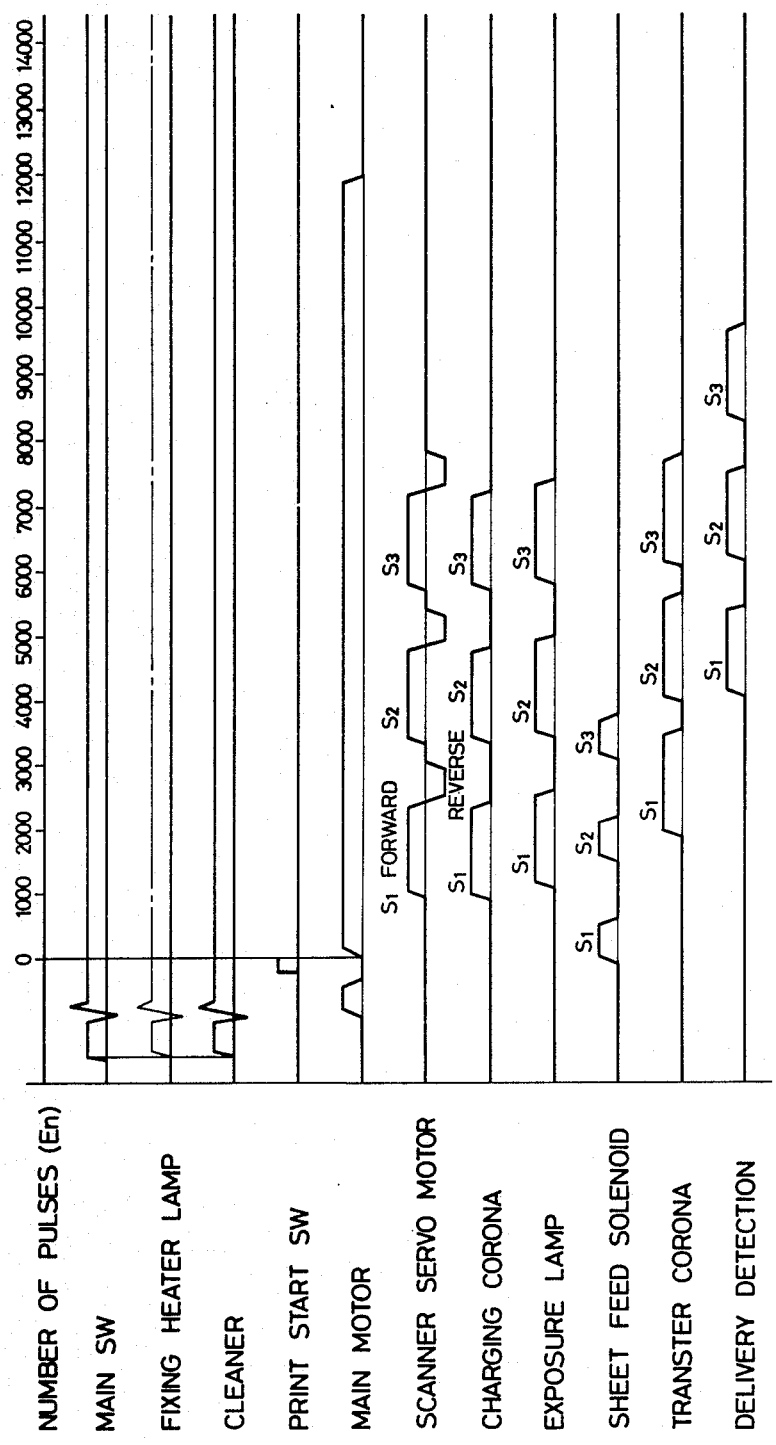

The machine of this embodiment comprises the encoder (En) for generating 200 pulses per rotation of the motor and performs speed control (constant speed control and synchronous control with the scanner servo motor) and timing control of a sequence. When a main switch is turned on, a fixing heater lamp and a solenoid of the photosensitive drum cleaner are turned on. Thus, the cleaner is brought into tight contact with the photosensitive drum. When a temperature of the heater reaches a predetermined temperature, a copy enable signal is generated. Simultaneously, the motor is rotated several times, thus cleaning the photosensitive drum. In this case, the cleaner is brought into tight contact with the surface of the photosensitive drum and the discharging lamp is turned on. When the print start switch is turned on, the driving motor is rotated and the encoder pulses are supplied to the microcontroller (MC), thus starting a copy seqence. When the counting starts and reaches a predetermined value, the MC starts its operation. For example, when 1,000 pulses are counted, the scanner servo motor is rotated and scans the original surface. Simultaneously, the charging corona starts charging, and provides an electrostatic potential on the surface of the photosensitive drum. Similarly, the exposure lamp is turned on, and a first sheet is fed when the print start key is depressed. A discharge detection switch detects that the sheet is discharged outside the machine, and in the timing chart shown in FIG. 6-1, it detects an A4-size sheet. FIG. 6-1 shows the timing chart when three sheets are copied. When the third sheet is discharged, the main drive motor is rotated for an interval corresponding to the predetermined number of pulses and is stopped after performing the following process.

As is apparent from the timing chart, the copying process for the first sheet is started when a sheet feed solenoid is turned on by turning on the print start switch, and is completed when the sheet is discharged. At this time, i.e., when the discharge detection switch for detecting the first sheet ($S_1$) is turned off, the third sheet ($S_3$) has already been fed, and the scanner servo motor starts rotating for the third sheet ($S_3$). In the continuous copy mode, the MC performs the copying processes for the first, second third sheets parallel to each other. As the processing speed of the copy operation is increased, these parallel operations are increased.

Figure 8:
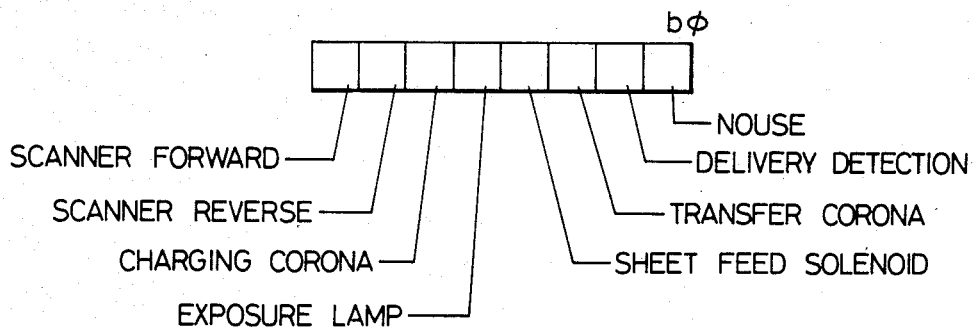
FIG. 8 is a view showing a content of a register $R_O$.
Figure 7:
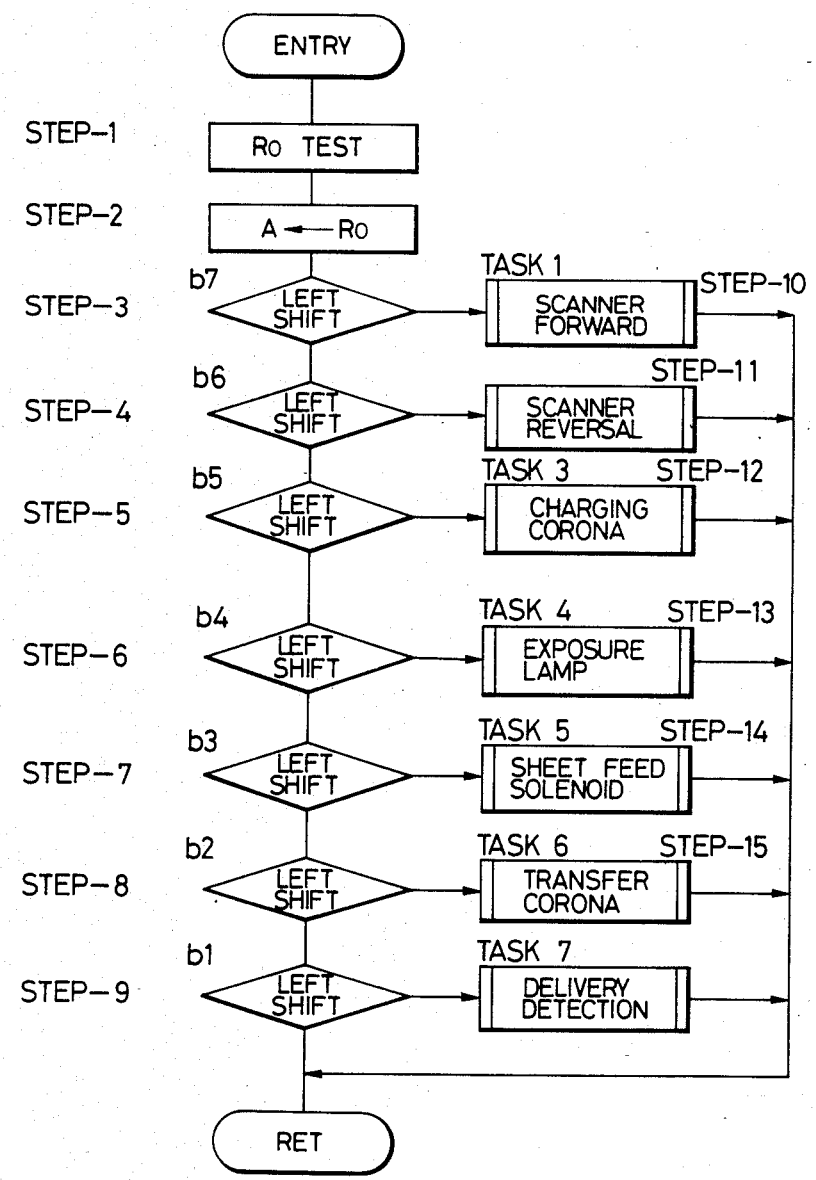
FIG. 7 is a view showing an example of a program of a step monitoring program.

Conventionally, such control depends upon programs, and the number of copied sheets is compared for each processing program module so as to discriminate by flagging which processing step is being performed for which sheet, and what portion of each step is being processed. Operation of a conventional copy machine will be described in more detail hereinafter. FIG. 7 shows an example of a program of a step monitoring module. Note that FIG. 7 corresponds to FIG. 6 and only shows main tasks, but in practice, sub tasks are also provided. A program module of FIG. 7 is used for checking statuses that indicate what task is being currently executed, In STEP-1, if there are tasks to be processed and executed, corresponding status bits of the register $R_0$ are flagged, and the task are executed. FIG. 8 shows a content of the register $R_0$. In STEP-2, contents of the register $R_0$ are transmitted to an accumulator A. In STEP-3 to STEP-9, it is checked if respective status bits are flagged. A bit is flagged to indicate that the processing step corresponding to the status bit is being executed.

Since it is determined that the status bit 7 is flagged in STEP-3, the CPU calls a forward rotation task of the scanner motor in STEP-10, and if it is detected in accordance with the task that it is a timing for the forward rotation of the motor, the scanner motor performs servo control so as to control a motor speed and position. In the conventional machine, even when multitask processing is performed, a single MPU cannot perform real-time and sequence control. For this reason, a special MPU for servo control is provided. The result processed by the servo control MPU as a slave MPU is transmitted to a host MPU, thereby generating a command signal.

When there are remaining tasks to be processed, the status bits shown in FIG. 8 are sequentially tested. The status bits of the register $R_0$ are monitored by each task module so as to sequentially test processing tasks in STEP-10 to STEP-16. When no status bit is flagged, this indicates that the next task to be executed is standing by or the copying operation is completed. This discrimination is performed by testing an upper status bit (not shown).

Figure 9:
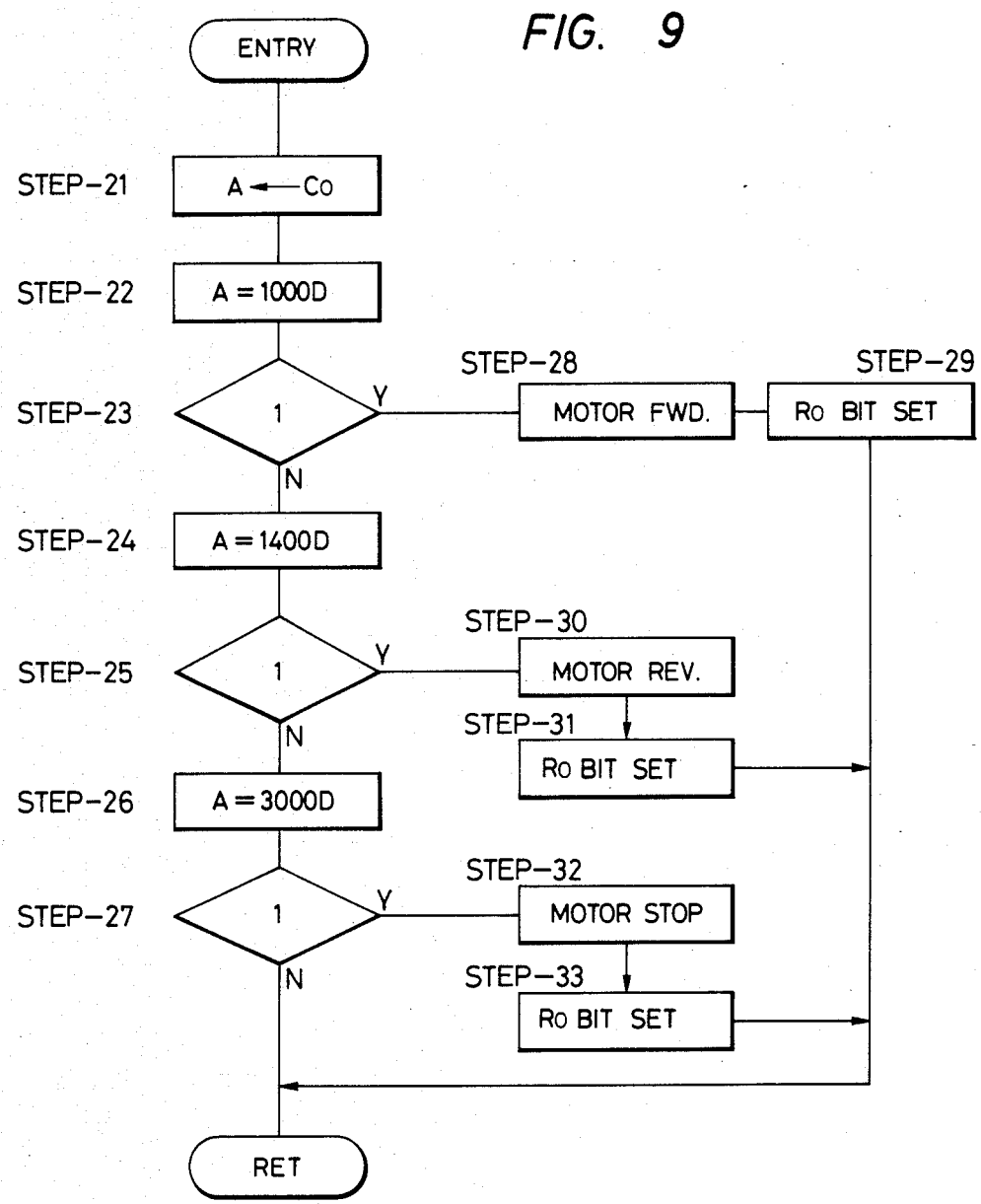
FIG. 9 is a view showing a control module of a scanner motor.

FIG. 9 shows a control module of the scanner motor. In STEP-21, a count of the timing pulses stored in the counter CO is transmitted to the accumulator A, and it is discriminated if the count corresponds to a 1,000th pulse, in STEP-22. In practice, since the MPU multiprocesses various tasks, one or two pulses can be erroneously counted, and the number of pulses is discriminated within the range of A=995 to 1,005, thus further complicating the program. As the processing speed is increased and the timing pulses are supplied at a shorter interval, the timing processing of a program count type cannot follow them.

In STEP-23, the count coincides with the 1,000th pulse (D in FIG. 9 means a decimal number), and the host MPU supplies to the slave MPU the command signal to rotate the motor in the forward direction. In STEP-29, the status bit of the register $R_0$ indicating that the forward rotation of the motor is being executed is flagged and the flow returns.

Similarly, commands for reverse rotation and stopping of the motor are executed In practice, a status for monitoring the task itself is provided in each task so as to effectively carry out the processing. As described above, in the conventional method, as the function of the machine is improved and processing is performed at a higher speed, the number of status bits is increased and that of programs for monitoring the status bits is also increased. Therefore, program capacity is greatly increased.

In order to overcome the above drawback, when sequence timing control counters and discrimination/collating registers of the same number as that of sheets to be processed in parallel are used and collating data is mapped in a memory so as to perform sequential comparison, timing processing can be satisfactorily executed by a simple program. The apparatus of this embodiment will be described hereinafter.

Referring again to the block diagram of the MC shown in FIG. 3-2, in a block $B_1$, three channels of counter/comparison registers, i.e., counters $CO_{1a}$ to $CO_{1c}$ and comparison registers $COM_{2a}$ to $COM_{2c}$, are provided so that three seqences can be simultaneously performed. The number of channels can be increased as needed, or a number of the channels is initially prepared and desired channels can be selected in correspondence with a specification of the machine when it is initialized. With this structure, since one sequence can follow the counter and the register of one channel so as to correspond to the flow of the sheet, the program is simple. When reset timings of the counters $CO_{1a}$ to $CO_{1c}$ are set by the program and are stored in a DATA $MAP_4$ as data, timing control can be automatically and mechanically performed. Referring to FIG. 6-1, pulses generated from the encoder En are simultaniously supplied to the the counters $CO_{1a}$ to $CO_{1c}$ through the line $l_8$. The counters $CO_{1a}$ to $CO_{1c}$ are registers for counting the pulses supplied through the line $l_8$ and are used for timing control. The counts of the counters $CO_1$ are supplied to the comparison/discrimination registers $COM_2$ through lines $l_9$ and are conpared with timing data stored in the DATA $MAP_3$. When coincidence between them is detected, the registers $COM_2$ then supply a signal with respect to an I/O port, a register and a memory to perform an operation. Lines $l_{10}$ are connected to the DATA $MAP_4$ and select data in a vector manner in accordance with oerations performed. The data compared and discriminated in the registers $COM_2$ are sequentially supplied through lines $l_6$ from a DATA $MAP_3$. Since this data is discrimination reference data for performing sequential control, the operations are sequentially performed, and if no operation is performed in one step, the next operation cannot be performed. For this reason, the registers $COM_2$ compare and discriminate in a sequential manner.

Figure 10:
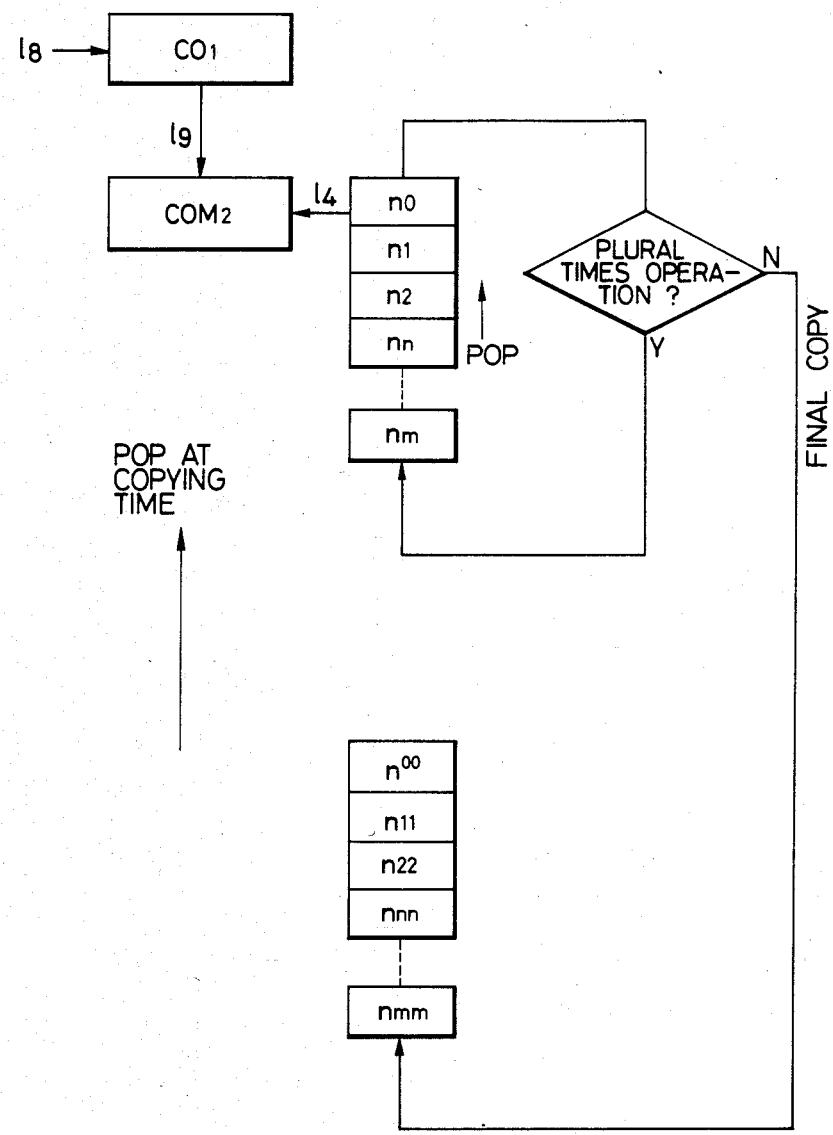
FIG. 10 is a view schematically showing a flow of timing data.

FIG. 10 schematically shows a flow of the timing data. When the data in the register $COM_2$ and the sequential timing data $n0$ to $nm$ are sequentially compared with each other, if coincidence between them s detected, a given operation is performed. The data $n0$ to $nm$ are increased in accordance with an increase in a sequential control amount. After control of a final copy mode is finished, although the data is compared in a loop manner up until the immediately preceeding data, this data is stored in another area. When copying is started, the overall data area is accessed, and this data is subjected to comparing, collating and discrimination operations.

Figures 2A, 6:
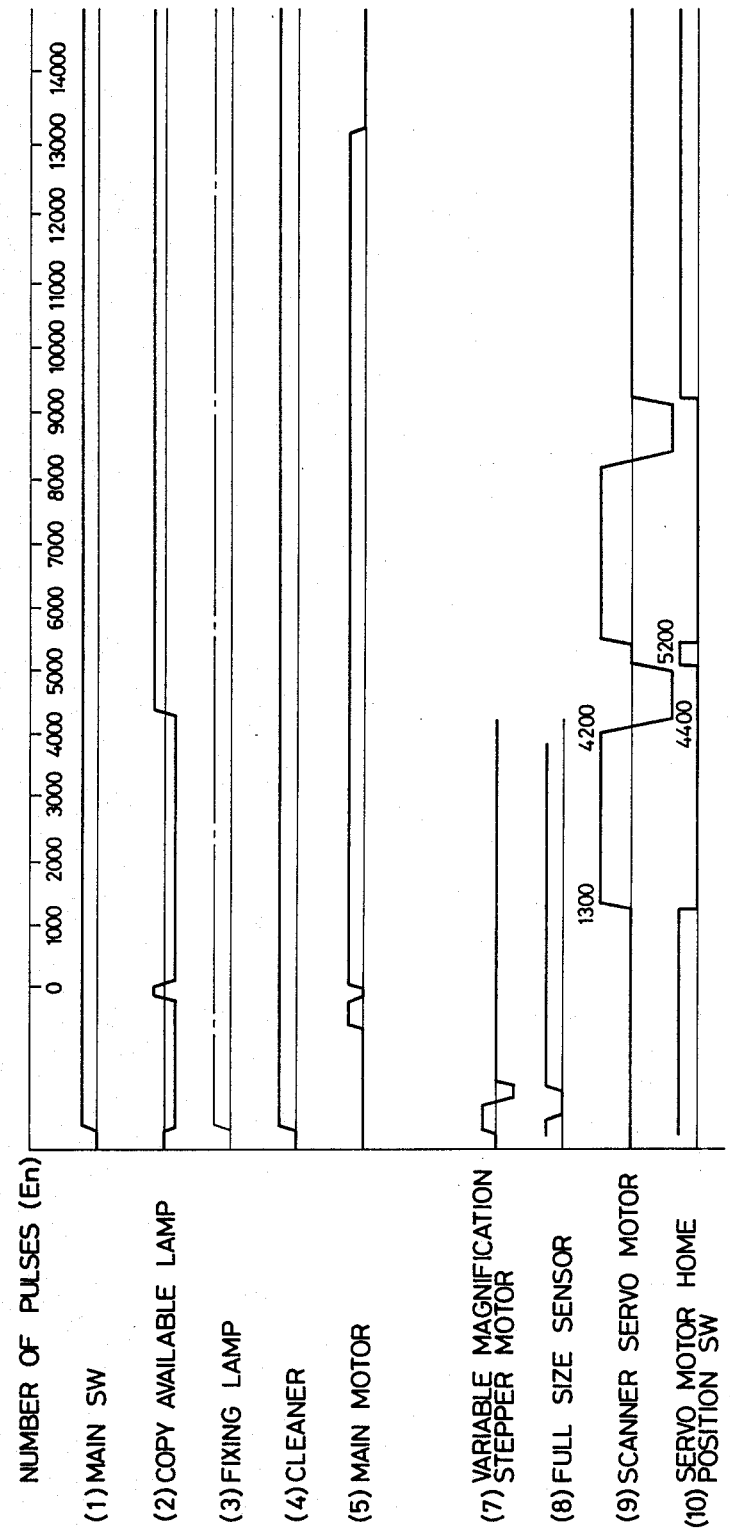
Figures 3, 6:
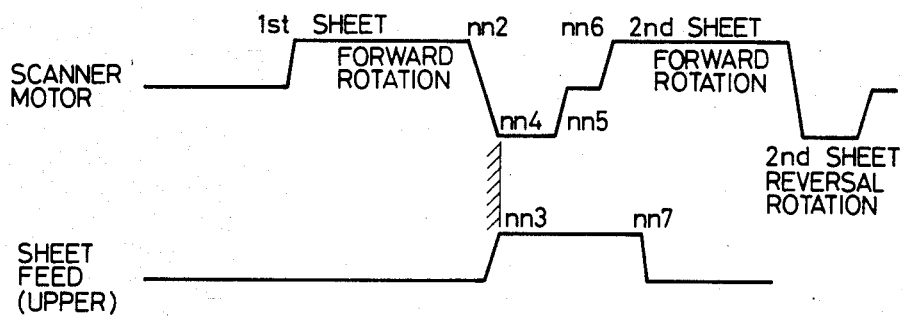

FIGS. 6-2(a) and 6-2(b) are timing charts of a middle size copy machine (corresponding to the middle speed machine in FIG. 5(b)). In FIGS. 6-2(a) and 6-2(b), copy cycles of two sheets are illustrated. In the copy machine, in the continuous copy mode, while an operation for a first sheet is being performed, that for a second sheet starts in accordance with the number of copies per minute, i.e., copy speed. Copying steps of the copy machine ar mechanical operations in accordance with copying processes, and mainly include sheet feed/convey, charging, exposure, transfer, peeling, fixing, discharging, cleaning operations and automatic control for stabilizing the scanner and fixing motors and exposure lamp. Devices along the axis of ordinate of the timing charts shown in FIGS. 6-2(a) and 6-2(b) are biased in accordance with the count of pulses from the encoder En.

For example, referring to FIGS. 6-2(a) and 6-2(b), when the scanner motor is rotated in the reverse direction for the first sheet, the sheet feed operation for the second sheet overlaps.

FIG. 6-3 shows this relationship. While the scanner motor is being rotated in the forward direction (i.e., the original is being scanned), the sheet feed operation for the second sheet is performed. As the copying speed of the copy machine is increased, tasks of the respective devices increasingly overlap. The copy machine shown in the timing charts in FIGS. 6-2(a) and 6-2(b) can copy 20 sheets per minute, and one copy can be formed every three seconds. FIG. 6-3 is a timing chart of a middle speed copy machine, and while the original is scanned by the scanner motor for the first sheet, the second sheet is fed. As has been described above, the sequence of the first sheet overlaps that of the second sheet. In the continuous copy mode, a test (for performing comparison, discrimination and processing) of the timings of the next overlapping cycle must be performed. In this embodiment, a capacity of the counter register $CO_1$ can be 14,000 counts, i.e., 14 bits. The DATA $MAP_3$ stores comparison/collating data for a two copy mode. In the continuous copy mode, as shown in FIG. 10, the counter comparison data is compared and collated by the register $COM_2$, and causes it to perform an operation (e.g., referring to the timing chart shown in FIG. 6-2(b), the preexposure lamp is turned off at a timing of the 3,000th pulse). Thereafter, the data are stored after the count data group again, and these data are sequentially accessed in a loop manner until the final copy operation, thus being subjected to comparison, collating and discrimination. In the final copy mode, as shown in FIG. 10, the count data is not subjected to comparison in the register $COM_2$ and is stored in another area. The overall data group is accessed when the copying operation is started, and comparison, collating and discrimination of the data are performed. As shown in FIG. 6-3, when the timings of the first and second sheets overlap each other, in a region of the counter data nn, the scanner motor is driven at a timing of data $nn_1$ (referring to the timing chart in FIG. 6-2(a), 1,300th pulse) so as to be rotated in the reverse direction at a timing of data $nn_2$. Then, the flag in the register is tested to determine whether or not the continuous copy mode is indicated. When the sequences of the copying operations for the first and second sheets overlap, the copying operation for the second sheet is performed while that for the first copy sheet is performed. For this reason, the above test is not performed by a CPU, but is automatically performed in the flow of the DATA $MAP_3$ shown in FIG. 10 when the data is accessed. When the next copying operation is standing by, the collating operation for the data $nn_3$ (4,300th pulse) and the data $nn_7$ (5,500th pulse) is performed, as shown in FIG. 6-2. However, in the final copy mode, when a copy cycle is not required, the data flow is stopped and the cycle is stopped at about the 14,000th pulse. In the continuous copy mode, the counter $CO_1$ is cleared at a timing corresponding to the 8,200th pulse when an even number sheet (second sheet) has been irradiated by light from the exposure lamp, and then restarts counting from zero. When the next first sheet is subjected to the copying operation, the processing for the previous, i.e., the immediately preceding second sheet continues, and this processing data is also stored in the DATA $MAP_3$.

In other words, in this count method, although the data for the first sheet is different from that of the third sheet, the data for the third and second sheets are repeatedly used in the continuous copy mode for three or more sheets.

In this manner, when the data map is repeatedly used, sequential control of the continuous copy mode can be performed simply.

As described above, when the data map is repeatedly used so as to correspond to the continuous copy sequences and steps are controlled with respect to one copy, the sequences can be controlled without programs.

In this method, unless an abnormality is detected, sequential control can be performed without interrupting the CPU. When the next operation is not performed after a predetermined time has elapsed or when the counter register $CO_1$ is not incremented, a watchdog timer is operated and detects the abnormality, thus interrupting the CPU. When the such a sequential control function is provided to an LSI controller chip, unlike the conventional microcomputer, tasks need not be tested by programs, and the number of days required for development can be greatly decreased.

In the conventional method, every time one count pulse is supplied, it is checked by the program and the CPU is operated. For this reason, continuous speed control of the mortor, A/D and D/A conversion, and the like are performed by special functional elements provided outside the microcomputer. However, when the above-mentioned functions are provided on the chip, external elements need not be provided, and a total automatic sequential controller can be acheived by a single chip.

Figure 11:
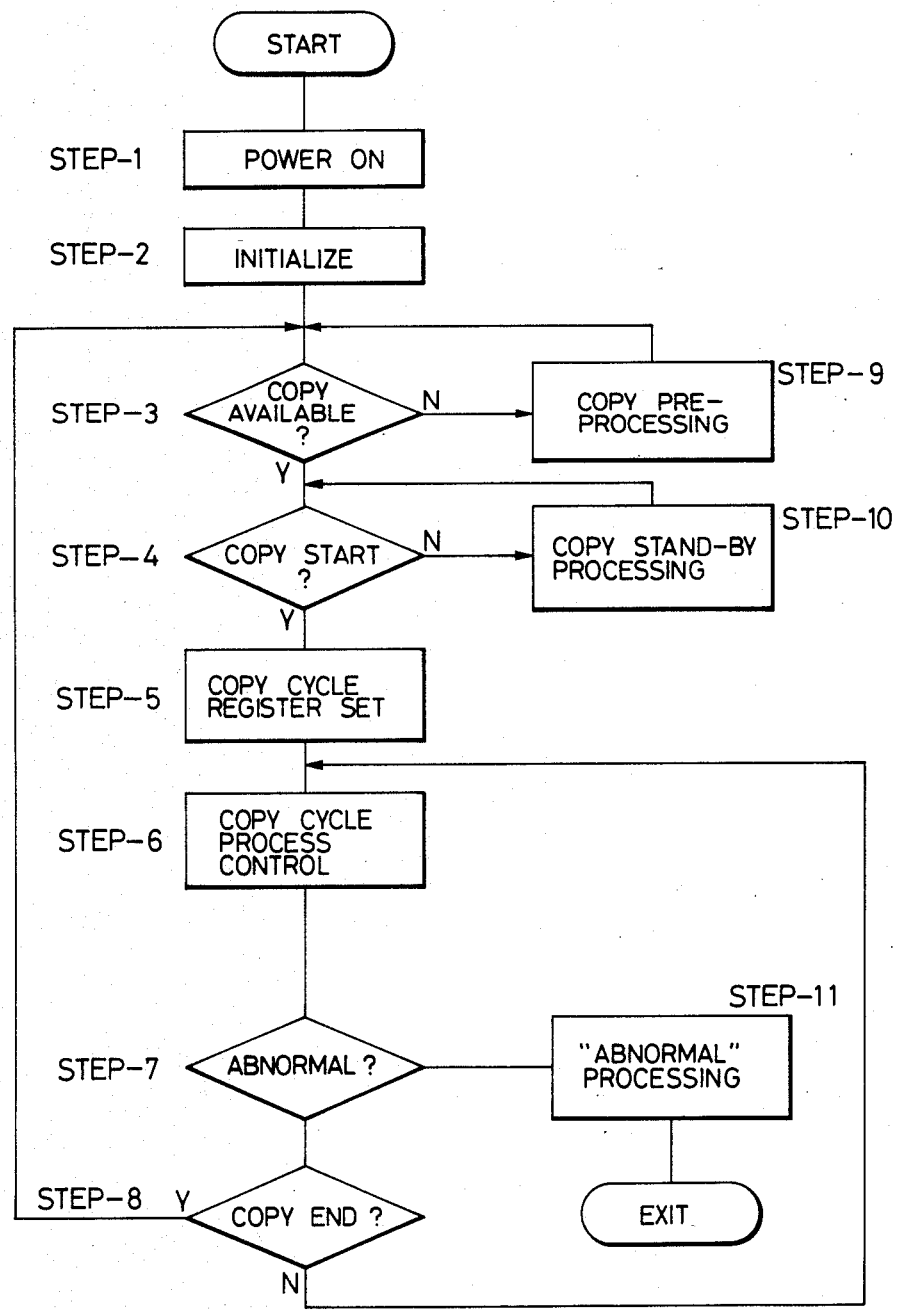
FIG. 11 is a general flow chart of a copy sequence.

FIG. 11 is a general flow chart of copying sequences using the feature of the present invention and will be explained hereinafter.

STEP-1: Power ON.

STEP-2: Respective registers are initialized. In this case, as described above (FIG. 10), the sequence data stored in the ROM (program memory) is transmitted to the DATA $MAP_3$. Although the sequence code can be fixed on the DATA MAP as the ROM code, compatibility cannot be provided. For example, data for different operations are stored in the ROM of a common microcontroller for, e.g., U.S.A., Europe and domestic markets, and a switch and the like is provided to a port of the controller so as to select them. Furthermore, the sequence channel registers (channels) are designated so as to correspond to the function of the machine.

STEP-3: It is tested whether or not the copy machine is in the copy enable state, that is, if the initialization of the mechanical components is completed, for example, in the case of a fixing unit having a heater, if a temperature thereof reaches a preset temperature, or if the photosensitive drum is cleaned. If N (NO) in STEP-3, the above-mentioned processing (i.e., copy pre-processing) is performed in STEP-9.

STEP-4: The copy start switch is tested. When the copying operation is not started, the copy stand-by processing is performed in STEP-10. In this case, the copy number data is received, and an abnormality is monitored.

STEP-5: The flow enters in the copy cycle. Thus, the registers in FIG. 5 are cleared and the copy number data is set in the register (although not shown in the architecture in FIG. 5).

STEP-6: The sequential control described in FIG. 5 is performed. Only when the preset data is changed, the CPU is interrupted, otherwise, the servo control of the sequence control motor is performed without using the CPU.

STEP-7: The abnormality is checked. In this case, the abnormality is abnormal sequence control and automatic control, paper jam, empty toner hopper, and mechanical malfunction of the temperature control.

STEP-8: It is tested if the copying operation is completed. As described above, this is checked not by a program, but by checking a content of the register using hardware.

STEP-9: As described above, copy pre-processing includes initialization of the mechanical components, positioning thereof (returning to corresponding start positions), and cleaning of the photosensitive drum.

STEP-10: The copy stand-by processing, e.g., checking of the copy machine, safety check, positioning and the like is performed.

STEP-11: The "abnormal" processing is performed in accordance with the abnormality. In the case where the toner hopper is empty, the flow returns to STEP-2, and the machine is set in the stand-by mode until the hopper is refilled. In the case of an abnormality in the temperature or the control system, power to the machine is cut off, and the machine is set in the stand-by mode until these are recovered.

Figure 12:
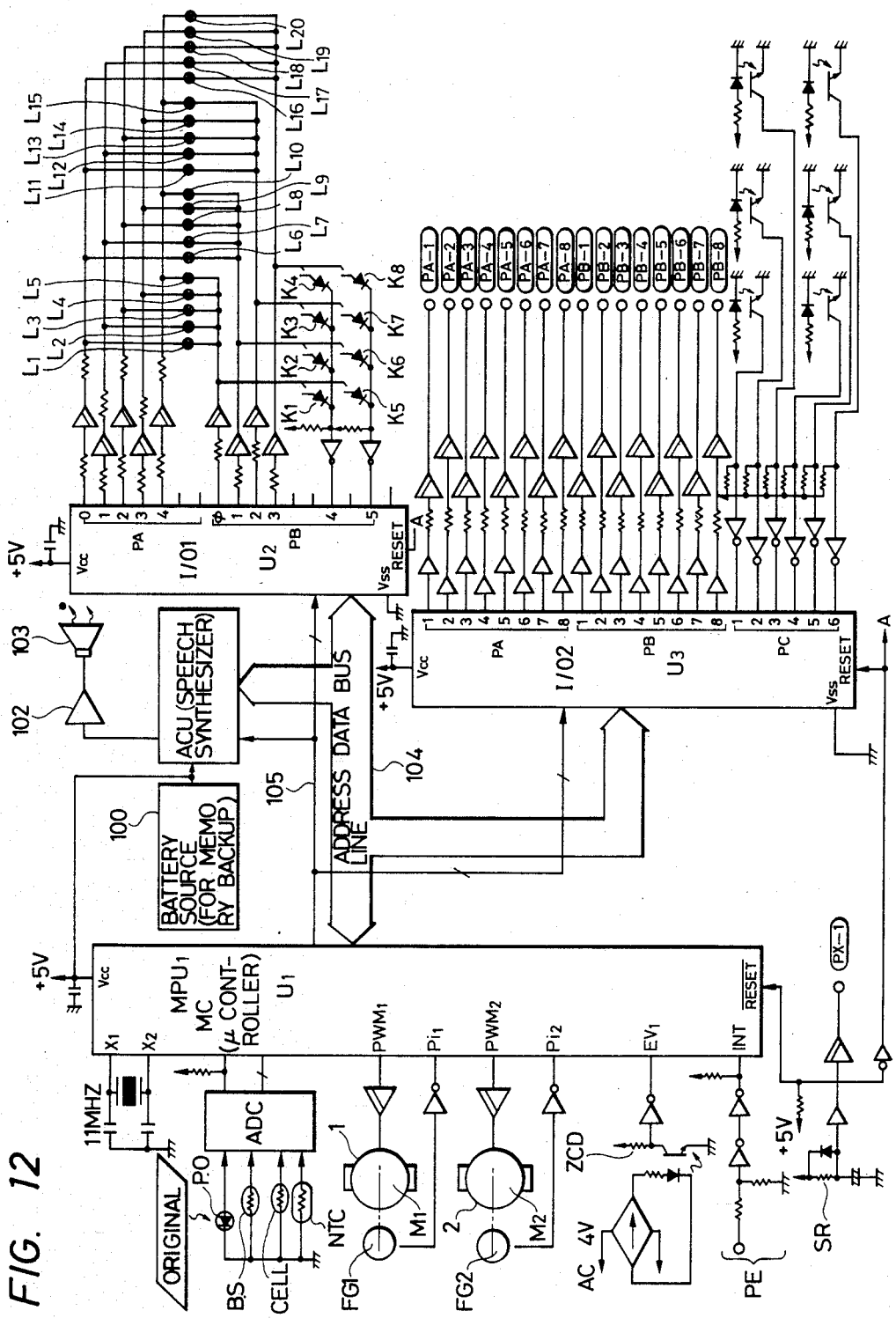
FIG. 12 is a view showing a circuit configuration to which the microcontroller is applied.

FIG. 12 is a circuit diagram to which the microcontroller according to the present invention is applied. This copy machine control apparatus comprises four chips, i.e., a microcontroller $MPU_1$ ($U_1$), I/O extension elements $U_2$ and $U_3$ and a speech synthesizer (ACU). Two DC motors (main driving motor $M_1$ (1) and an optical system scanner motor $M_2$ (2)) are driven by intelligent I/O ports $PWM_1$ and $PWM_2$ of the MC ($U_1$) A pulse input port $Pi_1$ is provided for receiving pulses generated from a frequency generator $FG_1$ of the main driving motor $M_1$. Two registers are provided, one for counting the pulses from the $FG_1$ so as to perform overall sequential control and the other for counting a pulse interval thereof so as to perform servo control.

Similarly, a pulse input port $Pi_2$ is provided for receiving pulses generated from a frequency generator $FG_2$ so as to detect speed and position of the scanner motor using two registers in the same manner as in the port $Pi_1$. As compared to the conventional method, the number of external and special-purpose parts is decreased, and an encoder for generating clock pulses (timing pulses) for controlling the overall sequence is not needed. A count value of the encoder pulses for timing control is supplied to the port $Pi_1$ of the microcomputer $U_1$. The registers in the ports $Pi_1$ and $Pi_2$ are arranged as shown in FIG. 3. An output port is arranged in the same manner as in the ports $Pi_1$ and $Pi_2$. With this structure, since servo control of the motor control system is processed by the registers of the I/O port of the microcontroller without using a program, the CPU can perform other sequence control, Therefore, in the copy machine which performs real-time processing, unlike the conventional machine, a plurality of microcomputers for an automatic control system is not needed, resulting in high reliability, low cost and minimum space. The microcontroller shown in FIG. 12 is used for the middle speed machine (20 to 30 sheets/minute). The I/O extension elements are provided because the number of I/O ports of the MC is insufficient. However, in a small system, the I/0 extention elements are not needed. A 4-channel detector A/DC performs temperature control (NTC) by acquiring analog data, detection of the image density of the original (PD), detection of a human body (BS. activating the speech synthesizer by detecting infrared light from a human body), and detection of image density (CELL) for adjusting a lamp voltage. A zero-crossing detector ZCD is connected to an input port $EV_1$ of the microcontroller. A power failure detector PE detects a voltage drop in a power source and supplies a signal to an INT terminal of the microcontroller, thereby interrupting the program to hold data. A system reset circuit SR is provided for resetting the RAM and the like when the machine is powered, and is connected to a RESET terminal of the microcontroller MC ($U_1$) and a DC power relay (PX-1) and RESET terminals of the I/O extension elements $U_2$ and $U_3$. A battery power source 100 is provided for backing up a memory. A speech synthesizer ACU 101 is provided for signaling an abnormality in the machine through an amplifier 102 and a loudspeaker 103. An address data bus line 104 and a control line 105 connect the microcontroller and the two I/O extension elements.

The I/O extension element $U_2$ controls an operation display unit, keys, display lamps, and the like. A port PA controls indicator LEDs, e.g., function state indicators $L_1$ to $L_5$, density indicators $L_6$ to $L_{10}$, and sheet number counter indicators $L_{11}$ to $L_{20}$. A port PB controls key inputs, e.g., from a copy start key $K_1$, a clear/stop key $K_2$, a counter (+) key $K_3$, a counter (−) key $K_4$, a density setting key $K_5$, an auto key $K_6$, a manual key $K_7$ and a checking guide key $K_8$ for checking a state of the machine, each comprising a semiconductor diode.

The I/O extention element $U_3$ performs sequence control as an extended I/O port of the MC. Ports PA-1 to PA-8 of a port PA are respectively provided for performing preexposure control, sheet feed clutch control, register clutch control, pulse motor (variable magnification lens shift) control, cleaning, used toner convey motor control, high voltage power source control, power relay control, and heater control, In the port PB , a port PB-1 is provided for lamp control, ports PB-2 to PB-4 are provided for erase lamp control, ports PB-5 to PB-7 are provided for developing bias control, and a port PB-8 is provided for buzzer control. Ports PC-1 to PC-6 of a port PC are respectively provided for receiving a remaining toner detection signal, a recovered toner detection signal, an original detection signal, a cassette sheet detection signal, a transferred sheet jam detection signal, and discharged sheet detection signal.

Note that when a plurality of the above circuits are provided, multitask operation can be extended, and plurality of equipment can be controlled.

We claim:

1. A sequence control apparatus comprising:
   a plurality of channel means, each channel means comprising count means for counting an input timing signal, and comparison means for comparing a count value from said count means and reference data;

data supply means for supplying the reference data for sequence control to said comparison means in said channel means;

designating means for designating the selection of a channel means among the plurality of said channel means in accordance with the number of objects to be processed in parallel; and output means for outputting control signals to controlled elements in accordance with the comparison result of said comparison means.

2. An apparatus according to claim 1, wherein designation of said channel means is performed when power is turned on.

3. An apparatus according to claim 1, said data supplying means comprising memory means for supplying the reference data to said comparison means.

4. An apparatus according to claim 3, further comprising separate memory means containing an additional plurality of reference data, wherein selected reference data from said plurality of reference data is transmitted from said separate memory means to the memory means of said data supplying means in accordance with a control object.

5. An apparatus according to claim 1, wherein said plurality of channel means, said data supplying means and said output means are arranged on a single chip.

6. An apparatus according to claim 1, wherein said apparatus is adapted to sequence control an image forming apparatus for forming an image on a plurality of sheets, wherein said number of objects to be processed in parallel is the number of sheets to be simultaneously placed into said image forming apparatus.

7. An apparatus according to claim 1, wherein said data supplying means is common to said plurality of channel means.

8. A sequence control apparatus comprising:
count means for counting an input timing signal;
comparison means for receiving reference data for sequence control and for comparing a counted value received from said count means and the reference data;
data supply means for supplying the reference data for sequence control to said comparison means, said data supplying means comprising memory means containing a plurality of reference data, wherein said supplying means moves said plurality of reference data sequentially in a ring-form in accordance with the comparison result of said comparison means; and output means for outputting a control signal to controlled elements in accordance with the comparison result of the comparison means.

9. In apparatus according to claim 8, wherein said data supplying means moves said plurality of reference data sequentially in a ring form when the counted value and the reference data coincide as determined by said comparison means.

10. A sequence control apparatus for controlling, in parallel, a number of elements comprising:
a plurality of channel means, each channel means comprising signal generating means for counting an input timing signal, and for generating a first signal when counting a predetermined number of input timing signals;
data supplying means for supplying data involved in said predetermined number for sequence control to said signal generating means in said channel means;
designating means for designating the selection of a channel means among the plurality of said channel means in accordance with the number of elements to be controlled in parallel; and
output means for outputting second signals to controlled elements in accordance with the first signal generated from said signal generating means.

11. A sequence control apparatus comprising:
signal generating means for counting an input timing signal and for generating a first signal when counting a predetermined number of input timing signals;
data supplying means for supplying data involved in said predetermined number for sequence control to said signal generating means, said data supplying means comprising memory means containing a plurality of data, wherein said supplying means moves said plurality of data sequentially in a ring-form in accordance with the first signal generated from said signal generating means; and
output means for outputting a second signal to a controlled element in accordance with the first signal generated from said signal generating means.

* * * * *

UNITED STATES PATENT AND TRADEMARK OFFICE
CERTIFICATE OF CORRECTION

PATENT NO. : 4,800,482
DATED : January 24, 1989
INVENTOR(S) : MASAO HOSAKA, ET AL.

It is certified that error appears in the above-identified patent and that said Letters Patent is hereby corrected as shown below:

SHEET 2

Figure 3-1, "COMPAPISON" should read --COMPARISON--.

SHEET 5

Figure 6-1, "TRANSTER CORONA" should read --TRANSFER CORONA--.

COLUMN 2

Line 13, "performed," should read --performed.--
    Line 33, "porcessing" should read --processing--.

COLUMN 5

Line 1, "CPU osillator" should read --CPU oscillator--.
    Line 30, "n0 na to nb" should read --$n0 \leq na$ to $nb$--.
    Line 37, "nb," should read --nb.--.

COLUMN 6

Line 36, "seqence." should read --sequence.--.
    Line 63, "second" should read --second and--.

UNITED STATES PATENT AND TRADEMARK OFFICE
CERTIFICATE OF CORRECTION

PATENT NO. : 4,800,482
DATED : January 24, 1989
INVENTOR(S) : MASAO HOSAKA, ET AL.

It is certified that error appears in the above-identified patent and that said Letters Patent is hereby corrected as shown below:

COLUMN 7

Line 10, "executed," should read --executed.--.
    Line 12, "task" should read --tasks--.

COLUMN 8

Line 15, "seqences" should read --sequences--.
    Line 27, "simultaniously" should read --simultaneously--.
    Line 28, "the the" should read --the--.
    Line 33, "conpared" should read --compared--.
    Line 39, "oerations" should read --operations--.
    Line 51, "s" should read --is--.
    Line 56, "preceeding" should read --preceding--.

COLUMN 9

Line 1, "ar" should read --are--.

COLUMN 10

Line 26, "the such" should read --such--.
    Line 34, "mortor," should read --motor,--.

COLUMN 11

Line 42, "$MC(U_1)$" should read --$MC(U_1)$.--.

UNITED STATES PATENT AND TRADEMARK OFFICE
CERTIFICATE OF CORRECTION

PATENT NO. : 4,800,482
DATED : January 24, 1989
INVENTOR(S) : MASAO HOSAKA, ET AL.

Page 3 of 3

It is certified that error appears in the above-identified patent and that said Letters Patent is hereby corrected as shown below:

COLUMN 12

Line 6, "I/O extention elements" should read
        --"I/O extension elements--.
    Line 41, "I/O extention element $U_3$" should read
        --I/O extension element $U_3$--.
    Line 48, "control," should read --control.-- and
        "port PB" should read --port PB,--.
    Line 49, ",a" should read --a--.
    Line 58, "discharged" should read --a discharged--.

COLUMN 14

Line 7, "In" should read --An--.

Signed and Sealed this

Twelfth Day of December, 1989

Attest:

JEFFREY M. SAMUELS

*Attesting Officer*    *Acting Commissioner of Patents and Trademarks*